United States Patent
Haas et al.

(10) Patent No.: US 6,415,698 B1
(45) Date of Patent: Jul. 9, 2002

(54) APPARATUS FOR CUTTING WAFER SANDWICHES

(75) Inventors: Franz Haas, Vienna; Johann Haas, Klosterneuburg; Gerhard Liebermann, Mannhartsbrunn, all of (AT)

(73) Assignee: Franz Haas Waffelmaschinen-Industrie Aktiengesellschaft, Vienna (AT)

( * ) Notice: Subject to any disclaimer, the term of this patent is extended or adjusted under 35 U.S.C. 154(b) by 0 days.

(21) Appl. No.: 09/540,334

(22) Filed: Mar. 31, 2000

(30) Foreign Application Priority Data

Mar. 31, 1999 (AT) .................................. 581/99

(51) Int. Cl.⁷ ........................... B26D 5/00; B26D 7/00
(52) U.S. Cl. ................... 83/255; 83/932; 83/72; 83/76.6; 83/268; 83/276; 83/404; 83/425.2; 83/431; 83/697; 83/468.6; 83/613; 83/435.2; 83/435; 83/858; 83/639.1; 99/537
(58) Field of Search ............... 83/76.9, 72, 207, 83/212, 230, 268, 276, 391, 404, 408, 425.2, 431, 751, 753, 758, 762, 446, 466.1, 468.5, 468.6, 423, 614, 404.2, 435.2, 435, 858, 932, 76.6, 255; 99/537

(56) References Cited

U.S. PATENT DOCUMENTS 3,990,336 A * 11/1976 Soodalter .................. 83/425.3
4,111,087 A * 9/1978 Pankratz et al. ............ 83/210
4,175,458 A * 11/1979 Paris, Jr. et al. ............ 83/268
4,364,311 A * 12/1982 Platt, III .................. 83/158 X
4,489,632 A * 12/1984 Albrecht et al. ........... 83/404.2
5,335,571 A * 8/1994 Pike ........................... 83/13
5,397,106 A * 3/1995 Hill .......................... 83/408 X

FOREIGN PATENT DOCUMENTS

DE            37 32 269        4/1989

* cited by examiner

*Primary Examiner*—Boyer Ashley
(74) *Attorney, Agent, or Firm*—Herbert Dubno; Andrew Wilford

(57) ABSTRACT

An apparatus for cutting a wafer sandwich into a plurality of rectangular pieces has a support surface defining a transport path extending longitudinally through a longitudinal-cutting station and a transverse-cutting station. A plurality of stationary and transversely spaced longitudinal blades extend across the path in the longitudinal-cutting station. The surface is formed in the transverse-cutting station with a plurality of transversely extending and longitudinally spaced slots. An abutment is displaceable immediately downstream of the transverse-cutting station between a blocking position in the path and a retracted position clear of the path. A plurality of transverse blades are displaceable transversely in the slots of the transverse-cutting station across the path. A conveyor above the surface has pusher elements engageable with the wafer sandwich for pushing it longitudinally in a transport direction along the path through the longitudinal-cutting station, into the transverse-cutting station and against the abutment in the blocking position thereof, and out of the transverse-cutting station in the retracted position of the abutment.

17 Claims, 3 Drawing Sheets

APPARATUS FOR CUTTING WAFER SANDWICHES

FIELD OF THE INVENTION

The present invention relates to an apparatus for cutting wafer sandwiches or stacks of wafer sandwiches. More particularly this invention concerns such an apparatus which longitudinally and transversely cuts a wafer sandwich into a plurality of small rectangular pieces.

BACKGROUND OF THE INVENTION

In the production of cream-filled wafer confections, a sheet of highly friable wafer is coated on its upper side with a heated sticky filling, termed "cream," and then another such wafer is applied to it and the wafer sandwich thus formed is cooled to adhere the two wafer layers and cream filling together. When thus cooled the two wafers cannot be separated from the cream without destroying them.

Such a cream-filled sandwich is produced from relatively large wafer sheets measuring from 290 mm×460 mm to 350 mm×760 mm with a thickness of between 1 mm and 3 mm and a cream coating between 0.5 mm and 2 mm thick so that the resultant wafer sandwich measures between 3 mm and 20 mm thick, depending on how many cream layers are used. Obviously such a large item must be cut into small pieces for marketing. The small pieces can be sold as is or can be coated with chocolate.

The standard apparatus therefore normally stacks a plurality of such sandwiches atop one another into a wafer stack that it cuts into a group of strips that are then cut crosswise to subdivide them into a larger group of rectangular pieces. The outer edge strips are typically discarded because they are not of uniform dimensions and frequently the cream filling does not extend to the very edge. As mentioned, after cutting into rectangular pieces and discarding the irregular edges, the pieces are typically covered with chocolate or the like.

German patent document 3,732,269 of Pfister describes a wafer-sandwich cutter with two cutting stations spaced apart in a transport direction. The first cutter serves for longitudinally slicing with stationary blades spaced apart transversely of the transport direction. The second station has a plurality of blades spaced apart in the transport direction and movable transversely of the direction across the path of the wafer sandwich to cut the strips formed by the longitudinal cutter into pieces.

With this system a device upstream of the longitudinal cutter pushes the sandwiches through the two stations, with the upstream sandwiches bearing on the downstream sandwiches and moving them and the longitudinal strips formed in the first cutting station pushing the pieces in the downstream second cutting station. The transverse cutter in the second downstream station is provided with a slide reciprocal longitudinally in the transport direction and serving to form gaps between succeeding wafer sandwiches. This longitudinal slide is in a downstream position when a group of longitudinal wafer-sandwich strips are pushed onto it, simultaneously pushing out the pieces cut in the preceding transverse-cutting operation. Once a group of longitudinal strips is positioned on the longitudinal slide in its downstream position, a hold-down plate is pressed down against the top surfaces of the strips and then the hold-down plate and the longitudinal slide are stepped back upstream, opposite the normal transport direction to form a gap between the downstream ends of the strips held between the plate and longitudinal slide and the upstream ends of the previously transversely cut strips. Once the longitudinal slide and plate, with the group of longitudinal strips clamped between them, is moved into an upstream position, the strips are cut transversely.

The transverse cutter is comprised of a transverse slide movable transversely to the direction underneath the longitudinal slide and carrying a plurality of upwardly pointed triangular blades that project upward through transverse slots in the longitudinal slide and into downwardly open transverse grooves in the hold-down plate. The transverse slide is shifted across and back to cut the longitudinal strips into pieces, with the downstream pieces falling off the downstream end of the longitudinal slide. Then the longitudinal slide is moved back to its downstream position, the hold-down plate is lifted, and the conveyor pushes a new batch of longitudinal strips onto the longitudinal slide, pushing the freshly cut pieces off the downstream end of the longitudinal slide onto an output table whence they travel to a further processing step.

The double-slide structure is fairly complex to manufacture and maintain, especially in a foodstuff-handling machine that must be maintained meticulously clean. The guides for the longitudinal movement of the longitudinal slide must be transversely, adjustable or pivotal about a vertical axis in order to set the movement direction of the slide parallel to the travel direction of the workpiece and to adjust the cutter transversely. The slides require that some space be left for longitudinal movements between the longitudinal cutter and the output station which is substantially longer than a standard workpiece. The output station must have a hold-down beam that holds the last row of wafer pieces pushed into the output station so they are not pulled back when the longitudinal slide moves back upstream. This hold-down beam prevents wafer pieces from sticking to the upstream workpiece and being pulled back upstream when the longitudinal slide and hold-down plate retract upstream to create the gap necessary to eliminate the scrap pieces to be cut from the downstream ends of the strips they are holding. Furthermore the entire hold-down plate and the frame holding it are fairly complex also so that they further add to the expense of the machine and the difficulties in maintaining it.

With the known machine the group of longitudinal strips clamped between the longitudinal slide and the hold-down plate is moved upstream and then downstream. Meanwhile the strips held between the longitudinal slide and the hold-down plate are vertically compacted somewhat. In the pause before the longitudinal slide moves back upstream, the hold-down plate and the hold-down beam must both be pressed down on the respective workpieces, whereupon the longitudinal slide is retracted and the transverse slide is moved back and forth to cut the strips clamped between the hold-down plate and the longitudinal slide into pieces. Subsequently the hold-down plate and longitudinal slide are moved back downstream, the hold-down plate and hold-down bar are both raised, and the conveyor must step a new workpiece through the longitudinal cutter and onto the longitudinal slide. These movements are complex and must be perfectly synchronized, further adding to the cost of manufacture. The lifter for the hold-down plate and the drive for the transverse slide are carried on the longitudinal slide, making the structure that has to be moved fairly massive so that the actuator for the longitudinal slide has to be relatively powerful and, of course, expensive.

Another disadvantage of the known machine is that it cannot be used on wafer sandwiches whose upper surfaces are covered with anything, such as cream, caramel, powdered sugar, or the like which would stick to or be damaged by contact with the hold-down plate. The machine can only be used with wafer sandwiches having a dry and relatively stable top surface.

OBJECTS OF THE INVENTION

It is therefore an object of the present invention to provide an improved apparatus for cutting wafer sandwiches or stacks of wafer sandwiches.

Another object is the provision of such an improved cutting apparatus which overcomes the above-given disadvantages, that is which is relatively simple, which can be manufactured and maintained at low cost, and that can be used with all types of wafer sandwiches, even those with a sticky or fragile upper surface.

SUMMARY OF THE INVENTION

An apparatus for cutting a wafer sandwich into a plurality of rectangular pieces has according to the invention a support surface defining a transport path extending longitudinally through a longitudinal-cutting station and a transverse-cutting station. A plurality of stationary and transversely spaced longitudinal blades extend across the path in the longitudinal-cutting station. The surface is formed in the transverse-cutting station with a plurality of transversely extending and longitudinally spaced slots. An abutment is displaceable immediately downstream of the transverse-cutting station between a blocking position in the path and a retracted position clear of the path. A plurality of transverse blades are displaceable transversely in the slots of the transverse-cutting station across the path. A conveyor above the surface has pusher elements engageable with the wafer sandwich for pushing it longitudinally in a transport direction along the path through the longitudinal-cutting station, into the transverse-cutting station and against the abutment in the blocking position thereof, and out of the transverse-cutting station in the retracted position of the abutment.

Thus with this system the workpiece, which can be a single wafer sandwich but which is normally a stack of wafer sandwiches, is engaged only on its lower surface by the support surface, on its trailing edge by the pusher elements, and on its leading edge by the abutment. The pusher elements set the sandwich or stack of sandwiches in position against the abutment so the transverse blades can cut it accurately into transverse strips. Thus rather than clamping the workpiece between an upper hold-down plate and the conveyor surface, the workpiece is engaged at its leading and trailing edges during the transverse cutting operation, and only at its trailing edge during the longitudinal cutting operation. Even if the upper surface of the workpiece is covered with a sticky cream coating, the machine will function perfectly since only the blades make minor contact with this upper surface. The transverse cutting takes place without moving the workpiece which greatly simplifies the system by eliminating the complex slide apparatus hitherto used. There can be as few as three transverse blades, or a much larger number depending on the size of the confection being produced.

The blades can be simple flat structures with sharpened front edges that form a large acute angle with the surface so as to press down the workpiece as it is being cut. Alternately rotatable circular cutting disks can be used for very fragile materials.

According to the invention the transverse-cutting station is upstream in the direction from the longitudinal-cutting station so that the wafer sandwich is cut into transverse strips in the transverse-cutting station and then the transverse strips are pushed by the elements through the longitudinal-cutting station and are cut therein by the longitudinal blades into rectangular pieces. The advantage of this is that the irregular leading and trailing edges can be trimmed off the workpiece in the transverse-cutting station so that the workpieces will abut each other squarely in a longitudinal row as they are pushed downstream through the longitudinal cutter. Of course some situations might require that the longitudinal cutter be upstream of the transverse cutter.

An actuator is connected in accordance with the invention to the transverse blades for raising them at one longitudinal side of the transverse-cutting station, displacing them while raised transversely across the transverse-cutting station in the slots, lowering them at an opposite longitudinal side of the transverse-cutting station, and returning them transversely below the surface to the one side of the transverse-cutting station. All the transverse-cutting blades can be mounted on a common beam or carriage extending longitudinally between a pair of endless belts or chains lying in vertical planes spaced longitudinally in the transport direction. As the blade-carrying carriage travels along the upper stretches of the endless conveyor elements they will project through the slots and cut, and when in the lower stretches they will be returned back to the starting side of the transverse-cutting station.

The actuator also carries separating fingers movable transversely across the transverse-cutting station while the transverse blades are returned transversely below the surface to the one side of the transverse-cutting station. Thus these separating fingers, which serve to strip off the leading and trailing edges of the wafer sandwich being cut, are only engaged with the workpiece once the transverse-cutting blades are clear of it. The separating fingers include an upstream finger at an upstream end of a wafer sandwich in the transverse-cutting station so that the upstream finger separates end scraps from the upstream end of the wafer sandwich in the transverse-cutting station. They also include a downstream finger at a downstream end of the wafer sandwich in the transverse-cutting station so that the downstream finger separates end scraps from the down stream end of the wafer sandwich in the transverse-cutting station.

In accordance with the invention in the retracted position the abutment is below the path and has a face forming part of the surface. Further a controller is provided for moving the conveyor elements step-wise synchronously with displacement of the transverse blades.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
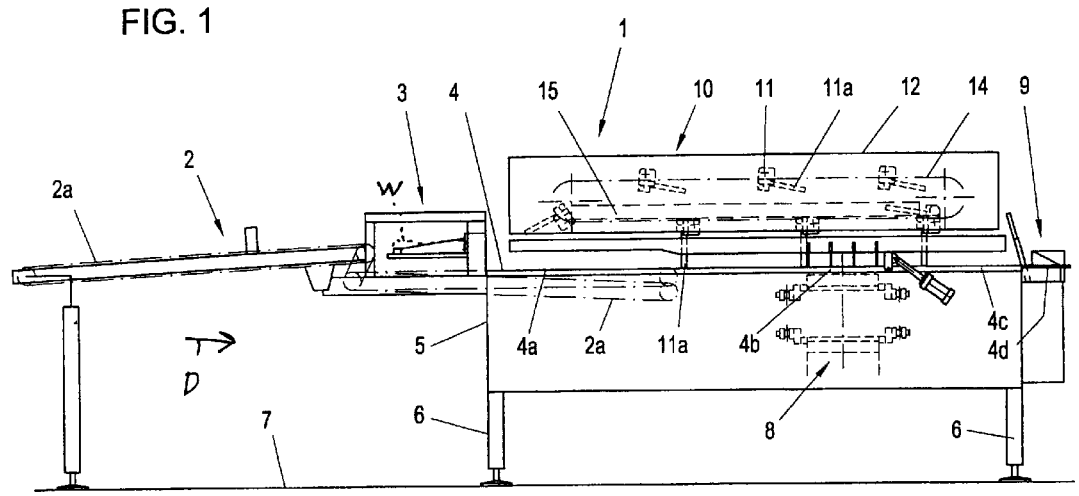
FIG. 1 is a partly diagrammatic side view of the apparatus according to the invention.
Figure 2:
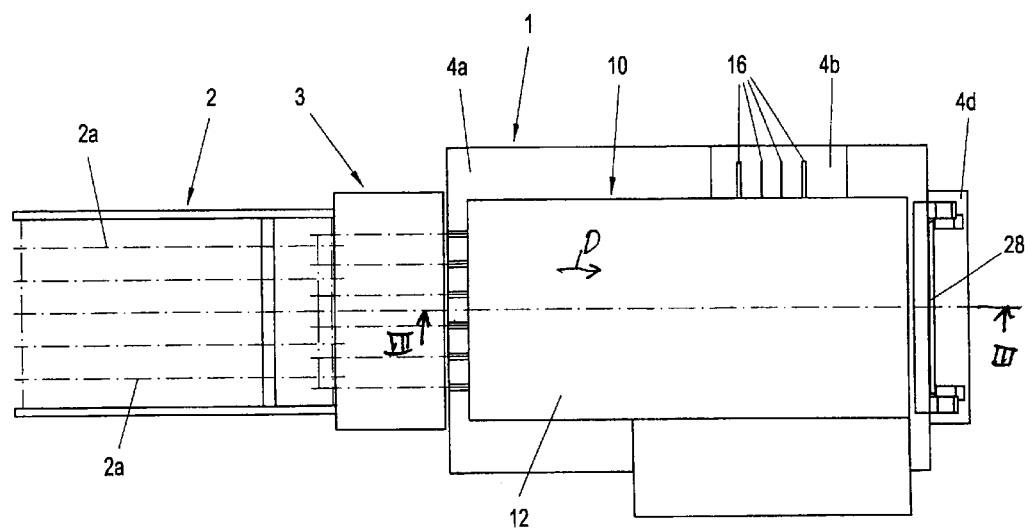
FIG. 2 is a top view of the apparatus.
Figure 3:
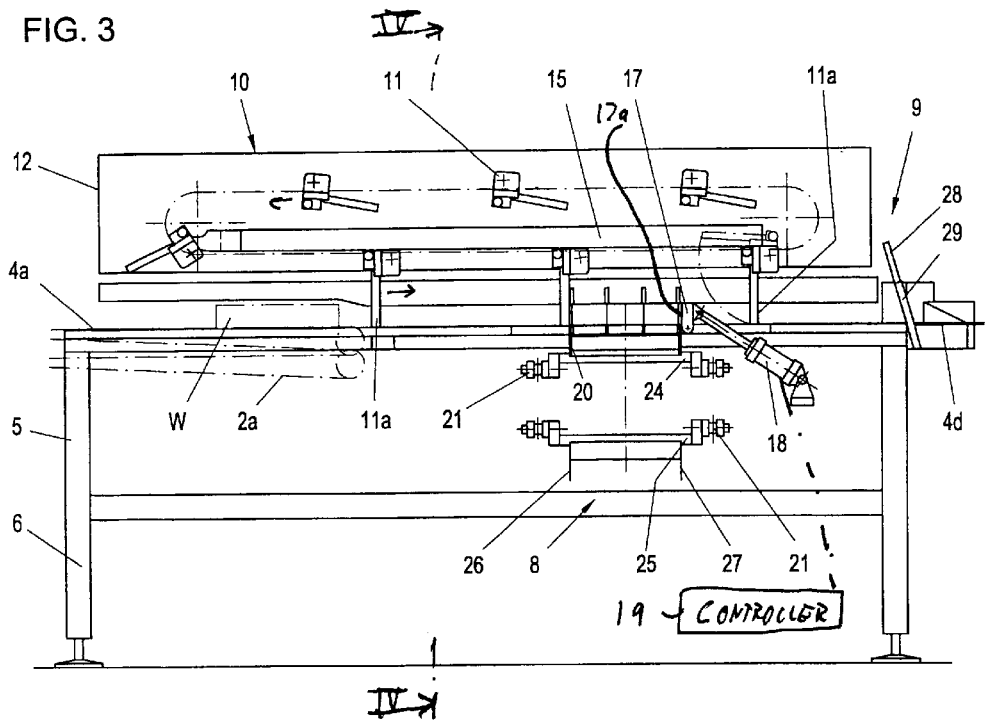
FIG. 3 is a larger-scale longitudinal section taken along line III—III of FIG. 2.
Figure 4:
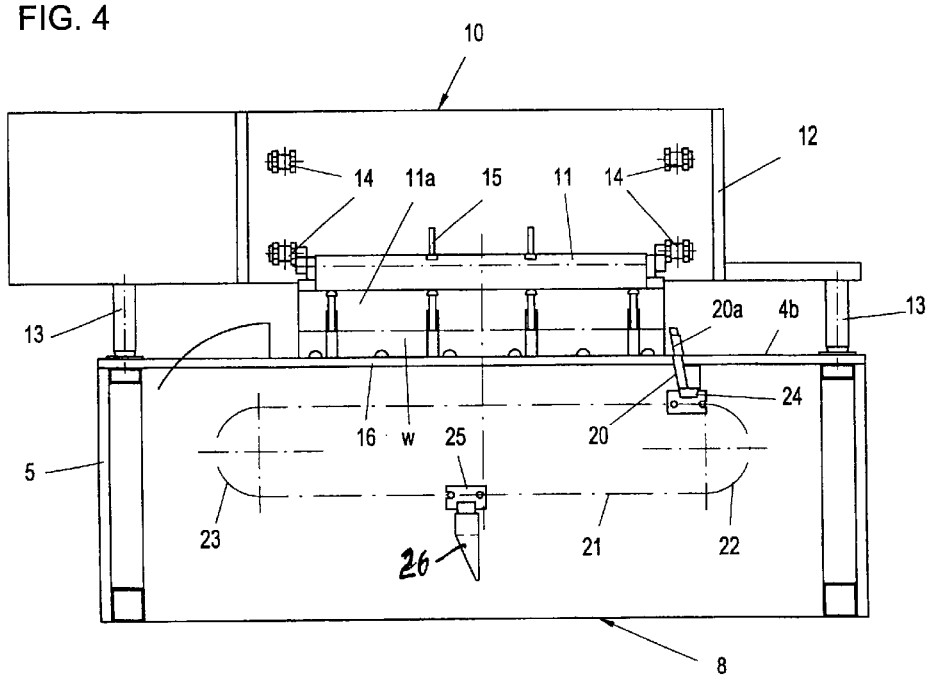
FIG. 4 is a cross section taken along line IV—IV of FIG. 3.

As seen in FIGS. 1 to 4 a wafer-sandwich cutter 1 according to the invention has an input device 2 that has a conveyor belt 2a that feeds individual wafer sandwiches each with two or more wafer layers and at least one cream layer through a stacker 3 that produces stacks W of wafer sandwiches. From the stacker 3 the stacks W are moved by the belt 2a in a direction D along a horizontal path defined by a surface 4 supported by a frame 5 on feet 6 standing on the floor 7 to a transverse-cutting station 8. A conveyor 10 situated above the surface 4 transports the stacks W from the transverse-cutting station 8 in the direction D through a longitudinal-cutting station 9.

The conveyor 10 is effective along an upstream portion 4a of the surface 4 from the downstream end of the stacker 3 through the transverse-cutting station 8 and has a plurality of transversely extending beams 11 each carrying a respective pusher plate 11a that can be pressed against the downstream or trailing ends of the stacks W to advance them step-wise in the direction D through the station 8. The conveyor 10 is supported on a portal-like frame 12 standing via vertically extensible feet 13 on the main frame 5 and has a pair of endless belts 14 carrying the beams 11, with the lower stretches of the belts 14 moving in the direction D. The feet 13 can be extended to raise the frame 12 and give access for cleaning to the underlying equipment. The plates 11a pivot from a folded-back position extending generally parallel to the belts 14 in the upper return stretch of the belts 14 to a transversely projecting position in the lower stretches. Guide rails 15 (FIG. 4) engage the beams 11 in the lower stretches of the belts 14 so they track accurately and do not pivot back into their folded-back positions. These plates 11a therefore engage the trailing ends of the stacks W and advance them in the direction D first through the transverse-cutting station 8 and then through longitudinal-cutting station 9.

The support surface 4 has a portion 4b formed in the station 8 with transversely extending and longitudinally equispaced slots 16. Immediately downstream therefrom is an abutment plate 17 swingable by an actuator 18 operated by a controller 19 into a blocking position shown in FIG. 3 in which it is erect and its planar face 17a extends perpendicular to the direction D, blocking downstream movement of any wafer stack W. In an unillustrated retracted position the face 17a forms a horizontal smooth continuation of the portion 4b of the conveyor surface 4 in the station 8 and a portion 4c immediately downstream therefrom.

A plurality of transverse-cutting blades 20, here four, are mounted on endless chains 21 advanced by an unillustrated motor operated by the controller 19 so that the blades 20 each pass along a respective one of the slots 16 through the transverse-cutting station 8. The blades 20 are carried on a mounting block 24 securing them to the chains 21 and the chains 21 are spanned at ends 22 and 23 over unillustrated wheels driven step-wise by the controller 19. The blades 20 have cutting edges 20a that are inclined at a large acute angle to the surface so that they will hold down and cut through the stack W in the station 8 when moving along the slots 16. The chains 21 also carry a carriage 25 that supports upstream and downstream separating fingers 26 and 27 that track in the furthest upstream and furthest downstream slots 16. These separating fingers 26 and 27 are spaced transversely on the chains 21 from the blades 20 by a distance equal to more than the transverse width of the transverse-cutting station 8 so that the fingers 26 and 27 only engage in the cuts made by the farthest upstream and downstream blades 20 after the cuts have been made, so as to trim off the upstream and downstream edges of the stack W in the station 8.

At the downstream end of the conveyor portion 4c in the longitudinal-cutting station 9 is a frame 28 holding a plurality of longitudinal-cutting blades 29 (FIG. 3) inclined to the plane of the surface 4 like the blades 20 but spaced apart transversely of the direction D and lying in respective planes parallel to the direction D. Thus as the pushers 11a force the transversely cut stack W through the station 9, the transversely extending strips will be cut into individual rectangular pieces. Thence the pieces pass out through an output portion 4d of the conveyor surface 4.

The system works as follows:

Wafer sandwiches are stacked in the stacker 3 into stacks W, although it is within the scope of this invention to cut a single wafer sandwich, which are advanced by the conveyor 2a to the transverse cutting station 8. The stack W is pushed by the element 11a against the raised abutment 17 and held in place, with the conveyor 10 momentarily stopped. The controller 19 advances the blades 20 across the station 8 so as to cut the stack W into transverse strips, and then passes the fingers 26 and 27 through the farthest upstream and downstream cuts to trim off the upstream and downstream edges of the stack W.

The abutment 17 is then lowered and the conveyor 10 advanced another step to push the transversely cut stack W out of the station 8 and into the station 9 and to push a fresh uncut stack W into the station 8. As the transversely cut stack W is pushed through the station 9, it is cut as described above into the desired rectangular pieces.

Figure 5:
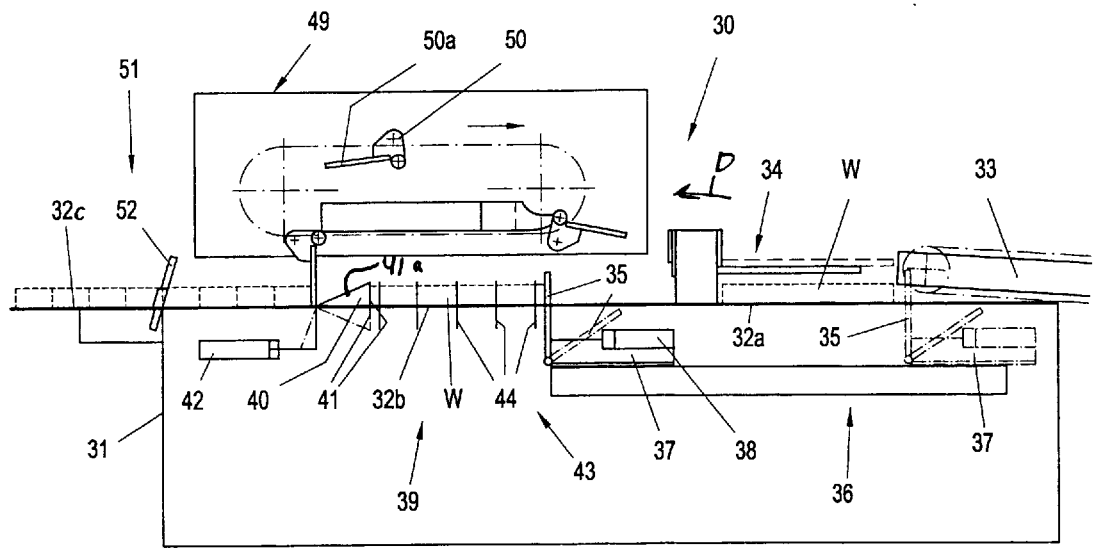
FIG. 5 is a view like FIG. 3 of another apparatus according to the invention.

FIG. 5 shows a further embodiment of a wafer-sandwich cutter 30 according to the invention where a lower frame 31 supports a horizontal conveyor surface 32a, 32b, 32c. An input device 33 feeds individual wafer sandwiches to a stacker 34 from which wafer-sandwich stacks W move on an upstream portion 32a of the conveyor surface 32a, 32b, 32c. Arms 35 of a sandwich pusher 36 can project up through slots in the portion 32a. This pusher 36 is carried on a slide 37 and is movable between its raised pushing position from its lowered (dashed line in FIG. 5) out-of-use position by an actuator 38 also carried on the slide 37.

Downstream of a transverse-cutting station 39 which itself is at the downstream end of the surface portion 32a and at the downstream end of the travel stroke of the pusher 36 is a right-triangular abutment 40 having an end face 41 that can block advance of the stack W and another face 41a that when lowered by a cylinder 42 forms a coplanar portion of the support surface 32a, 32b, 32c.

A transverse cutter 43 in the station 39 comprises a plurality of transverse blades 44 carried on chains 45 (FIG. 6) spanned on unillustrated wheels at ends 46 and 47 and engaging through slots in a surface portion 32b between the portion 32a and the abutment 40. Edges 44a of these blades 44 extend perpendicular to the plane of the surface portion 32b. Stripper fingers 48 are also carried on the chains 45 at a spacing greater than the maximum width of the stack W as in FIGS. 1 to 4.

Above and extending downstream from the station 30 is an upper conveyor 49 having transverse pusher beams 50 carrying pusher plates 50a that can be moved downstream in direction D through the station 30 once the stack W is transversely cut. Thus this conveyor 49 takes over from the lower conveyor formed by the pusher arms 35.

Downstream of the transverse-cutting station 39 is a longitudinal-cutting station 51 having angled longitudinal blades 52 extending up from a downstream or output portion 32c.

Figure 6:
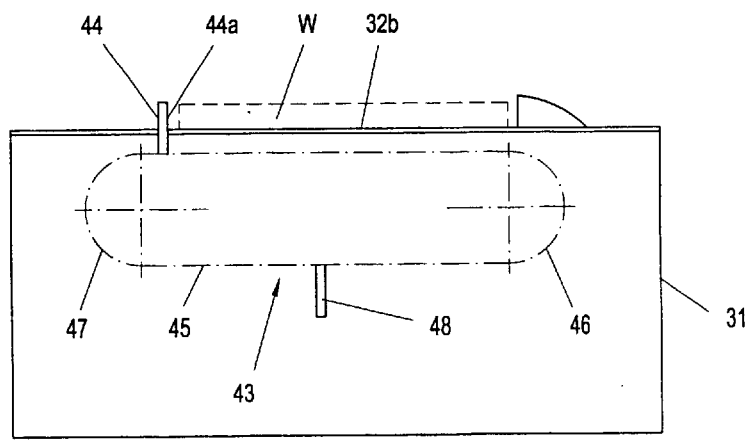
FIG. 6 is a large-scale cross section through a detail of the apparatus of FIG. 5.

This system operates much like that of FIGS. 1 to 4 except that the conveyor belt 2a of FIGS. 1 to 4 is replaced by the pusher-type conveyor 36 of FIGS. 5 and 6.

We claim:

1. An apparatus for cutting a wafer sandwich into a plurality of rectangular pieces, the apparatus comprising:

a support surface defining a straight and horizontal transport path extending longitudinally through a longitudinal-cutting station and a transverse-cutting station, the surface being formed in the transverse-cutting station with a plurality of transversely extending and longitudinally spaced slots;

a plurality of stationary and transversely spaced longitudinal blades extending across the path in the longitudinal-cutting station;

an abutment displaceable immediately downstream of the transverse-cutting station between a blocking position in the path and a retracted position clear of the path;

a plurality of transverse blades projecting upward from below through the slots and displaceable transversely in the slots of the transverse-cutting station across the path; and conveyor means including pusher elements above the surface engageable with the wafer sandwich for pushing the sandwich longitudinally in a transport direction along the path through the longitudinal-cutting station, for pushing the sandwich into the transverse-cutting station and against the abutment in the blocking position thereof, and for pushing the wafer sandwich out of the transverse-cutting station in the retracted position of the abutment.

2. The cutting apparatus defined in claim 1 wherein the transverse-cutting station is upstream in the direction from the longitudinal-cutting station, whereby the wafer sandwich is cut into transverse strips in the transverse-cutting station and then the transverse strips are pushed by the elements through the longitudinal-cutting station and are cut therein by the longitudinal blades into rectangular pieces.

3. The cutting apparatus defined in claim 1 wherein in the retracted position the abutment is below the path and has a face forming part of the surface.

4. The cutting apparatus defined in claim 1, further comprising control means for moving the conveyor elements stepwise synchronously with displacement of the transverse blades.

5. The cutting apparatus defined in claim 1 wherein the blades have cutting edges forming a large acute angle with the support surface, whereby the sandwich is pressed down against the surface as the blades move through the sandwich.

6. The cutting apparatus defined in claim 1, further comprising actuator means connected to the transverse blades for raising them at one longitudinal side of the transverse-cutting station, displacing them while raised transversely across the transverse-cutting station in the slots, lowering them at an opposite longitudinal side of the transverse-cutting station, and returning them transversely below the surface to the one side of the transverse-cutting station.

7. The cutting apparatus defined in claim 6, further comprising separating fingers connected to the actuator means and displaced by the actuator means transversely across the transverse-cutting station while the transverse blades are returned transversely below the surface to the one side of the transverse-cutting station.

8. The cutting apparatus defined in claim 7 wherein the separating fingers include an upstream finger at an upstream end of a wafer in the transverse-cutting station, whereby the upstream finger separates end scraps from the upstream end of the wafer sandwich in the transverse-cutting station.

9. The cutting apparatus defined in claim 7 wherein the separating fingers include a downstream finger at a downstream end of the wafer sandwich in the transverse-cutting station, whereby the downstream finger separates end scraps from the downstream end of the wafer sandwich in the transverse-cutting station.

10. An apparatus for cutting a wafer sandwich into a plurality of rectangular pieces, the apparatus comprising:

a support surface defining a straight and horizontal transport path extending longitudinally through a longitudinal-cutting station and a transverse-cutting station upstream of the longitudinal-cutting station, the surface being formed in the transverse-cutting station with a plurality of transversely extending and longitudinally spaced slots;

a plurality of stationary and transversely spaced longitudinal blades extending across the path in the longitudinal-cutting station;

an abutment displaceable immediately downstream of the transverse-cutting station between a blocking position in the path and a retracted position clear of the path;

a plurality of transverse blades projecting upward from below through the slots and displaceable transversely in the slots of the transverse-cutting station across the path; and conveyor means including pusher elements above the surface engageable with the wafer sandwich for pushing the sandwich longitudinally in a transport direction along the path through the longitudinal-cutting station, for pushing the sandwich into the transverse-cutting station and against the abutment in the blocking position thereof, and for pushing the wafer sandwich out of the transverse-cutting station in the retracted position of the abutment, whereby the wafer sandwich is cut into transverse strips in the transverse-cutting station and then the transverse strips are pushed by the elements through the longitudinal-cutting station and are cut therein by the longitudinal blades into rectangular pieces.

11. The cutting apparatus defined in claim 10 wherein in the retracted position the abutment is below the path and has a face forming part of the surface.

12. The cutting apparatus defined in claim 10, further comprising control means for moving the conveyor elements stepwise synchronously with displacement of the transverse blades.

13. The cutting apparatus defined in claim 10 wherein the blades have cutting edges forming a large acute angle with the support surface, whereby the sandwich is pressed down against the surface as the blades move through the sandwich.

14. The cutting apparatus defined in claim 10, further comprising actuator means connected to the transverse blades for raising them at one longitudinal side of the transverse-cutting station, displacing them while raised transversely across the transverse-cutting station in the slots, lowering them at an opposite longitudinal side of the transverse-cutting station, and returning them transversely below the surface to the one side of the transverse-cutting station.

15. The cutting apparatus defined in claim 14, further comprising separating fingers connected to the actuator means and displaced by the actuator means transversely across the transverse-cutting station while the transverse blades are returned transversely below the surface to the one side of the transverse-cutting station.

16. The cutting apparatus defined in claim 15 wherein the separating fingers include an upstream finger at an upstream end of a wafer in the transverse-cutting station, whereby the upstream finger separates end scraps from the upstream end of the wafer sandwich in the transverse-cutting station.

17. The cutting apparatus defined in claim 15 wherein the separating fingers include a downstream finger at a downstream end of the wafer sandwich in the transverse-cutting station, whereby the downstream finger separates end scraps from the downstream end of the wafer sandwich in the transverse-cutting station.

* * * * *